April 24, 1962  N. R. JENSEN  3,030,700
RETAINING RING SETTING TOOL
Filed Oct. 26, 1959
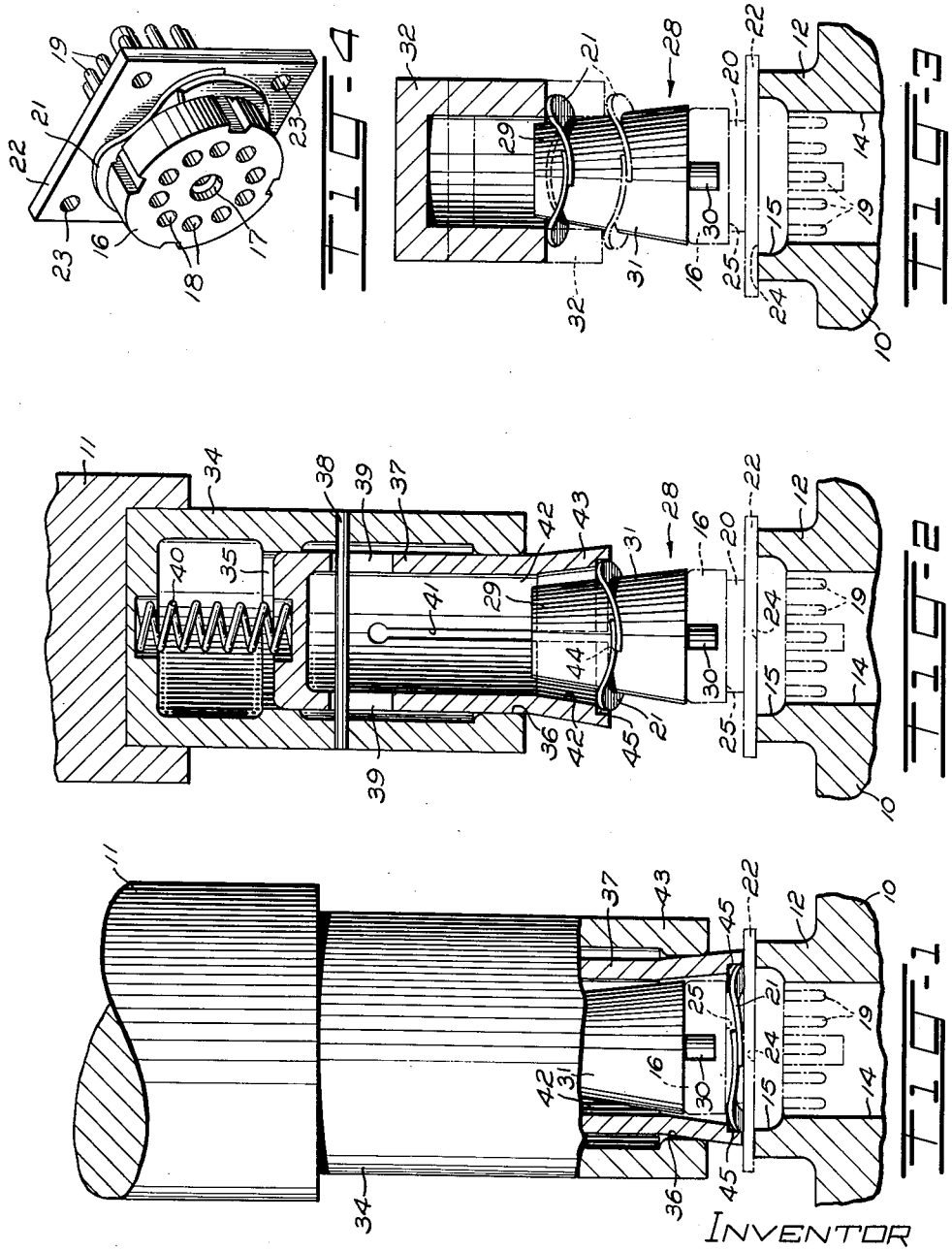
INVENTOR
N. R. JENSEN
By W. Johnson
ATTORNEY United States Patent Office 3,030,700
Patented Apr. 24, 1962

3,030,700
RETAINING RING SETTING TOOL
Norman R. Jensen, Berkeley Heights, N.J., assignor to Western Electric Company, Incorporated, New York, N.Y., a corporation of New York
Filed Oct. 26, 1959, Ser. No. 848,670
1 Claim. (Cl. 29—229)

This invention relates to apparatus for setting retaining rings, particularly undulated retaining rings in grooves of articles for use in securing parts to the articles.

It is recognized, as common practice, to attach parts to articles with conventional plain retaining rings. However, in such instances, there is not a firm non-movable or non-rotatable connection between the parts and the articles as sufficient clearance must be allowed for the rings to snap into the grooves when moved into alignment therewith. It is often desirable to provide a firm non-movable or non-rotatable connection between each part and its article, particularly when the part serves as a mounting plate for securing the article, such as a socket for a vacuum tube or the like, to a panel so that the socket will not be permitted to move out of a predetermined position. It has been found that this desired result may be accomplished by the use of undulated retaining rings which cannot be set by conventional means used for setting plain retaining rings.

The object of the present invention is an apparatus which is highly efficient in setting retaining rings, particularly undulated retaining rings.

In accordance with the object, the invention comprises a base member to support articles singly, a tapered element removably mounted on one end of the supported article, and having an outer end sufficiently small to receive a retaining ring and an inner end sufficiently large to spread the ring for movement over the adjacent end of the article when a tool, movable relative to the element, is forced by an actuator to move the retaining ring into alignment with the groove of the article and to force the retaining ring laterally into the groove.

More specifically, the tool is of a hollow piston-like structure disposed in the cylindrical-like actuator and provided with resilient jaws having outwardly tapered portions to engage an undulated retaining ring on the element and, during movement with the actuator, force the undulated retaining ring downwardly into engagement with the part and compress the ring to align it with the groove of the article. A spring interposed between the actuator and the tool translates sufficient force from the actuator to accomplish this purpose. After the undulated retaining ring has been compressed and aligned with the groove, additional movement of the actuator causes the resilient jaws of the tool to force the retaining ring to contract and move into the groove of the article.

Other objects and advantages will be apparent from the following detailed description when considered in conjunction with the accompanying drawings wherein:

FIG. 1 is a front elevational view of the apparatus in operated position, portions thereof being shown in section;

FIG. 2 is a vertical sectional view of the apparatus after the operating cycle has begun;

FIG. 3 is a vertical sectional view of a portion of the apparatus illustrating a proposed starting means for the undulated retaining ring; and FIG. 4 is an isometric view of a part mounted on an article and held thereon by the retaining ring.

In the present instance, the apparatus may embody any suitable type of press providing a bed, not shown, for supporting a base member 10 and having a manually operable or a single-cycle operable ram 11. The base member 10 is formed as shown in FIGS. 1, 2, and 3 with a nest 12 surrounding an aperture 14 and recessed at 15 to receive and support an article 16.

In the present instance, the article 16 is a socket-type structure formed largely of a body molded of suitable insulating material and provided with a central aperture 17 and a plurality of terminal receiving sockets 18 having terminals 19 mounted therein and extending downwardly therefrom. The article 16 has an annular groove 20 to receive an undulated retaining ring 21 which is to be used to secure a part 22, such as a mounting plate with apertures 23 therein, to the article 16. The article also has a surface 24 against which the part 22 is forced through the force created in the undulated retaining ring when it is disposed in the groove 20. The portion of the groove above the part 22 is greater in width than the thickness of the retaining ring which permits movement of the retaining ring into the groove when the ring is compressed. The groove also has a surface 25 which is engaged by the retaining ring and prevents the retaining ring from finding its normal position or contour, holding the retaining ring compressed to assure holding of the article in the part against movement or rotation.

The apparatus further includes a tapered element 28 having an upper end 29 sufficiently small to receive readily the retaining ring 21, the normal inside diameter of which is substantially equal the outside diameter of the portion of the article defined as the inside or bottom of the groove 20. The tapered element 28 has a projection 30 receivable in the central aperture 17 of the article to removably connect the element to the article and to centrally align it with the article. Furthermore, a lower portion 31 of the element 28 is sufficiently large to cause expansion of the retaining ring so that it can be moved freely downwardly over the upper portion of the article above the groove 20. A hollow member 32 is adapted to be placed on the retaining ring when located on the upper end of the element 28 to start its movement downwardly prior to operation of the apparatus to complete the operating cycle. The hollow member 32 is removed prior to the operation of the apparatus.

An actuator 34, cylindrical in general contour, is mounted in any suitable manner to the ram 11. An upper member 35 of the actuator cooperates with the lower member 36 thereof in providing guiding surfaces for a piston-like tool 37 which is movable in the actuator between the normal position, shown in FIG. 2 and the operated position, shown in FIG. 1. A pin 38 having its ends mounted in aligned apertures of the actuator 34 extends through the actuator and the tool 37, particularly through elongate apertures 39 of the tool.

A spring 40 interposed between the actuator 34 and the tool 37 serves to transmit a force from the actuator to move the tool with the actuator until the retaining ring has been compressed against the part 22 and positioned in alignment with the groove 20. The tool 37 has a plurality of vertical slots 41 therein to produce resilient jaws 42, the lower portions of which taper outwardly as at 43 to be acted upon by the lower member 36 of the actuator 34 to compress the jaws during movement of the actuator downwardly, as shown in FIG. 1, to force the compressed retaining ring into the groove 20. The jaws 42 have lateral surfaces 44 engaging the upper surface of the retaining ring to assure downward movement of the retaining ring over the element 28 and into engagement with the part 22 where these surfaces 44 will function further to compress the retaining ring to align it with its groove. Vertical surfaces 45 of the jaws 42 of the tool engage the outer edge of the retaining ring when the apparatus is moved to the position shown in FIG. 1 during inner action of the resilient jaws of the tool by the actuator 34 to force the compressed retaining ring into the groove.

Operation

During operation of the apparatus, an article 16 is placed in the nest 12 of the base member 10 and a part 22 is located concentric with the article on the nest and at a desired position with respect to the article so that at the completion of the mounting of the retaining ring, the article will be ready to be mounted on a panel or the like. The element 28 is mounted in position on the article and a retaining ring 21 is located on the upper end of the element. If desired, the member 32 may be omitted, its purpose being to start the retaining ring downwardly on the element to prevent any accidental displacement of the retaining ring prior to the operation of the apparatus.

At this time, the ram operating means is actuated to move the ram 11 downwardly, to move the actuator through a continuous motion downwardly to the position shown in FIG. 1.

This action of the actuator accomplishes different purposes, for example, its surfaces 35 and 36 guide the tool 37 to assure not only accurate positioning of the tool relative to the article, but efficient actuation thereof. The spring 40 applies sufficient force to cause the tool to accompany the actuator downwardly where the surfaces 44 of the jaws 42 will engage the retaining ring, force it downwardly over the element 28, and over the upper head-like portion of the article until it rests upon the part 22 and continues in its downward movement under the force of the spring to compress the retaining ring sufficiently to condition it to enter the groove 20.

At this time, the retaining ring has not only been compressed against the part 22 but the lower end of the tool has come to rest on the part where its downward motion has been terminated and the additional downward motion of the actuator 34 will cause its portion 36 to ride downwardly on the outwardly tapered surfaces 43 to flex the portions 42 of the tool inwardly causing the surfaces 45 to engage the outer edge of the retaining ring and force it into the groove.

Upward motion of the ram 11 brings about action of the apparatus in reverse order including relative movement of the actuator and tool to free the jaws to expand outwardly, after which the actuator is allowed to move upwardly while the tool is held downwardly by the spring 40 until picked up by the pin 38. At the end of this portion of the operating cycle, the element 28 may be removed from the completed article, the article may be removed from the nest and the steps may be repeated for another operating cycle.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

An apparatus for mounting parts on articles by setting undulated retaining rings in annular grooves of articles disposed intermediate ends of articles comprising a mase having a nest to receive and support the articles singly mounted with its vertical centerline disposed in a given position, a tapered element adapted for engagement with each article removably mounted centrally on the supported article and having an upper end sufficiently small to receive one of the rings and a lower end resting on the upper end of the article and sufficiently large to spread the ring for movement over the upper end of the article, a cylindrical actuator, a ram supporting the actuator and reciprocable with its centerline in alignment with the centerline of nest of the base to move the actuator toward and away from the article, a tool extending into the actuator and having resilient jaws with inner recesses having vertical and lateral portions, the lateral portions being positioned to engage the undulated ring, force the ring longitudinally of the element and the article and compress the ring against the part for alignment with the groove, a member carried by the actuator to support the tool for movement relative to the actuator between a normal and an operated position, a spring interposed between the actuator and the tool and adapted to cause the tool to remain in its normal position relative to the actuator and move with the actuator and ram until the undulated ring is compressed against the part, portions of the resilient jaws having outwardly tapered surfaces, and a member of the actuator disposed in engagement with the outer surfaces of the outwardly tapered jaws so that the jaws will be caused to flex inwardly during additional movement of the ram and the actuator relative to the tapered surfaces to cause the vertical portions of the recesses to force the compressed ring into the groove.

References Cited in the file of this patent

UNITED STATES PATENTS

| | | |
|---|---|---|
| 2,422,549 | Hogin | June 17, 1947 |
| 2,510,206 | Barkan et al. | June 6, 1950 |
| 2,629,442 | Veilleux | Feb. 24, 1953 |
| 2,877,070 | Lee | Mar. 10, 1959 |

FOREIGN PATENTS

| | | |
|---|---|---|
| 584,290 | Great Britain | Jan. 10, 1947 |